US011379769B2

(12) United States Patent
Kessler et al.

(10) Patent No.: US 11,379,769 B2
(45) Date of Patent: Jul. 5, 2022

(54) DETECTING IMPURITIES

(71) Applicant: Henkel AG & Co. KGaA, Duesseldorf (DE)

(72) Inventors: Arnd Kessler, Monheim am Rhein (DE); Lars Zuechner, Langenfeld (DE); Peter Schmiedel, Duesseldorf (DE); Thomas Rechenbach, Duisburg (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 104 days.

(21) Appl. No.: 16/493,430

(22) PCT Filed: Jun. 5, 2018

(86) PCT No.: PCT/EP2018/064721
§ 371 (c)(1),
(2) Date: Sep. 12, 2019

(87) PCT Pub. No.: WO2018/228862
PCT Pub. Date: Dec. 20, 2018

(65) Prior Publication Data
US 2020/0134806 A1    Apr. 30, 2020

(30) Foreign Application Priority Data
Jun. 12, 2017   (DE) ............... 10 2017 209 862.7

(51) Int. Cl.
*G06K 9/00* (2022.01)
*G06Q 10/06* (2012.01)
(Continued)

(52) U.S. Cl.
CPC ........ *G06Q 10/06316* (2013.01); *G06N 3/04* (2013.01); *G06N 3/084* (2013.01);
(Continued)

(58) Field of Classification Search
CPC ............... G06T 7/0012; G06T 7/0083; G06T 2207/30004; G06T 7/0081;
(Continued)

(56) References Cited

U.S. PATENT DOCUMENTS

2003/0019253 A1   1/2003  Lorenz et al.
2004/0119972 A1   6/2004  Smit-Kingma et al.
(Continued)

FOREIGN PATENT DOCUMENTS

CN         102720034 B     1/2014
DE     102013210996 A1    12/2014
(Continued)

OTHER PUBLICATIONS

Anonymous, "Wie werde ich Textilreiniger?", Nov. 2010 (Nov. 27, 2010), XP05549035, retrieved from the Internet: URL: https://www.sz-online.de/nachrichten/wie-werde-ich-textilreiniger-320254.html?bPrint-true, [retrieved on Jul. 5, 2018] 1 page.
(Continued)

*Primary Examiner* — Duy M Dang
(74) *Attorney, Agent, or Firm* — Lorenz & Kopf, LLP

(57) ABSTRACT

A method performed by one or more devices is disclosed. The method includes detecting a first image information item indicative of at least one soiling on a textile, determining a soiling information item indicative of at least one property of the soiling on the textile where the at least one property is determined based at least in part on the detected first image information item and the at least one property of the soiling is determined based at least in part on a property dependent on the outline of the soiling, and outputting or causing the outputting of the determined soiling information item. Furthermore, a device and a system for performing the subject method is disclosed.

15 Claims, 6 Drawing Sheets

(51) Int. Cl.
| | |
|---|---|
| *G06T 7/62* | (2017.01) |
| *G06T 7/50* | (2017.01) |
| *G06T 7/90* | (2017.01) |
| *G06N 3/04* | (2006.01) |
| *G06N 3/08* | (2006.01) |
| *G06T 7/00* | (2017.01) |
| *D06F 103/06* | (2020.01) |
| *D06F 34/18* | (2020.01) |
| *D06F 103/02* | (2020.01) |
| *D06F 105/10* | (2020.01) |
| *D06F 105/42* | (2020.01) |
| *D06F 105/58* | (2020.01) |

(52) U.S. Cl.
CPC ...... *G06Q 10/06311* (2013.01); *G06T 7/0004* (2013.01); *G06T 7/50* (2017.01); *G06T 7/62* (2017.01); *G06T 7/90* (2017.01); *D06F 34/18* (2020.02); *D06F 2103/02* (2020.02); *D06F 2103/06* (2020.02); *D06F 2105/10* (2020.02); *D06F 2105/42* (2020.02); *D06F 2105/58* (2020.02); *G06T 2207/20081* (2013.01); *G06T 2207/20084* (2013.01); *G06T 2207/30124* (2013.01)

(58) Field of Classification Search
CPC ............ G06T 2207/10116; G06T 5/40; G06T 2207/30068; G06T 7/0085; G06T 7/60; G06T 7/12; G06T 7/11; G06T 7/174; G06T 1/00; G06T 7/00; G06T 7/0016; G06T 7/13; G06F 19/321; G06F 16/5866; A61B 5/02007; A61B 5/7264; A61B 5/742; G06K 9/4604; G06K 9/52; G06K 9/6267; G06K 9/66; G06K 9/6262; G06K 9/00624; G06K 9/623; G06K 9/6253; G01N 33/4833; G01N 33/48; G01N 33/5091; G06N 20/00; G06Q 30/02; G06Q 30/0269; G06Q 30/0277
See application file for complete search history.

(56) References Cited

U.S. PATENT DOCUMENTS

| | | |
|---|---|---|
| 2010/0328450 A1 | 12/2010 | Wagner |
| 2016/0224860 A1 | 8/2016 | Koven et al. |
| 2016/0275775 A1* | 9/2016 | Glasgow ............ G01N 33/0001 |
| 2016/0349189 A1 | 12/2016 | Heinz et al. |
| 2017/0122882 A1 | 5/2017 | Preosti et al. |

FOREIGN PATENT DOCUMENTS

| | | |
|---|---|---|
| DE | 102015006765 A1 | 12/2016 |
| DE | 102016012896 A1 | 5/2017 |
| EP | 2405258 A2 | 1/2012 |
| WO | 2004055256 A1 | 7/2004 |
| WO | 2017032718 A1 | 3/2017 |

OTHER PUBLICATIONS

EPO, International Search Report issued in International Application No. PCT/EP2018/064721, dated Jul. 5, 2018, 7pages.
Anonymous, "Samsung Crystal Blue WW12H8400EW/EG Waschmaschine im Test", Apr. 2014 (Apr. 25, 2014), XP055490239, retrieved from the Internet: URL: https://etm-testmagazin.de/tests/samsung-crystal-blue-ww12h8400ew-eg-waschmaschine-im-test-1388, [retrieved on Jul. 4, 2018], 33 pages.
Anonymous, "Mehr als nur Flecken erkennen", Jul. 2013 (Jul. 1, 2013); XP055490346, retrieved from the Internet: URL: https://www.rw-textilservice.de/mehr-als-nur-flecken-erkennen/150/8660/225448, [retrieved on Jul. 5, 2018], 2 pages.
Anonymous, "Die Kunst, Flecken zu entfernen", Jun. 2007 (Jun. 1, 2007), XP055490208, retrieved from the Internet: URL: https://www.r-textilservice.de/die-kunst-flecken-zu-entfernen/150/8657/232402, [retrieved on Jul. 4, 2018], 6 pages.
Wikipedia Internet Article: "Artificial neural network", Jun. 11, 2017, XP055490246, Retrieved from the Internet: URL: https://en.wikipedia.org/w/index.php?title=Artificial_neural_network&oldid=785107627, retrieved on Jul. 4, 2018; pp. 1, 2, and 4.
Wikipedia Internet Article: "Computer vision", May 15, 2017, XP055490254, Retrieved from the Internet: URL: https://en.wikipedia.org/w/index.php?title=Computer_vision&oldid=780534539, retrieved on Jul. 4, 2018; pp. 1-10.
Mahajan et al., "A review of automatic fabric defect detection techniques", Advances in Computational Research, ISSN: 0975-3273, vol. 1, Is. 2, 2009, pp. 18-29.
Rebecca L. Schuler, et al., Preliminary Observations on the Ability of Hyperspectral Imaging to Provide Detection and Visualization of Bloodstain Patterns: Hyperspectral Imaging of Bloodstain Patterns on Black Fabrics: Hyperspectral Imaging of Bloodstain Patterns, Journal of Forensic Sciences, Bd. 57, Nr. 6, 7, May 7, 2012, pp. 1562-1569, Chicago, IL.
Da-Wen Sun, Computer Vision Technology in the Food and Beverage Industries, Aug. 27, 2012, Woodhead Publishing.
Van Dalen Gerard, et al., Colour Analysis of Inhomogeneous Stains on Textile Using Flatbed Scanning and Image Analysis, Conference on Colour in Graphics, Imaging, and Vision, CGIV 2008 Final Program and Proceedings, Jan. 1, 2008, pp. 53-57.

* cited by examiner

DETECTING IMPURITIES

CROSS REFERENCE TO RELATED APPLICATIONS

This application is a U.S. National-Stage entry under 35 U.S.C. 35 U.S.C. § 371 based on International Application No. PCT/EP2018/064721, filed Jun. 5, 2018, which was published under PCT Article 21(2) and which claims priority to German Application No. 10 2017 209 862.7, filed Jun. 12, 2017, which are all hereby incorporated in their entirety by reference.

TECHNICAL FIELD

The present disclosure relates to a device and a method for determining impurities.

BACKGROUND

Impurities on a textile such as garments, curtains or bedding are often difficult to identify. Impurities can not only affect the aesthetics of the textiles, but also represent a hygienic problem for the user of the textile.

Although many impurities are easy to detect by eye, it is often unclear to the user of the textile what the composition or origin of the impurity is. For example, in some cases, the user is unaware that the textile is soiled by an accident. The impurity, or soiling, then appears to the user only at a later time, wherein the cause and the composition of the soiling are unknown to the user. Impurities having different compositions can also have a very similar appearance to the eye, for example, blood stains and tomato stains, in particular after a certain period of time, can no longer be distinguished by the eye.

In doing so, it is desirable for the user to obtain an indication of properties of the impurity. In particular, impurities can be effectively removed by a cleaning process. Such cleaning processes can be considerably facilitated or even made possible through knowledge about properties of the impurity.

It is known to determine the color of an impurity in order to be able to roughly detect an identification of the impurity. However, the color of the impurity alone, such as a defined color value, is insufficient, however, to clearly identify the impurity. The knowledge of further properties about the impurity is necessary.

SUMMARY

Against the background of the prior art shown, it is thus an object of the present disclosure to at least partially reduce or avoid the problems described, that is, to further reach the most accurate possible knowledge about the properties of the impurity or soiling on the textile. In particular, the proposed methods and devices should be easy to use in the household.

This object is achieved objectively by a method having the features of claim 1.

According to a first aspect of the present disclosure, a method performed by one or more devices is described, the method comprising:
 detecting a first image information item indicative of at least one soiling on a textile;
 determining a soiling information item indicative of at least one property of the soiling on the textile, wherein the at least one property is determined based at least in part on the detected first image information item, and wherein the at least one property of the soiling is determined based at least in part on a property dependent on the outline of the soiling;
 outputting or causing the outputting of the determined soiling information item.

According to a second aspect, a device is described which is configured as or comprises corresponding features for performing and/or controlling a method according to the first aspect. Devices of the method according to the first aspect are or comprise in particular one or more devices according to the second aspect.

A soiling is understood as meaning in particular an accumulation of foreign matter on a material of a textile or a discoloration of the surface of the textile, in particular in the form of a stain, dirt or imperfections. For example, particles such as dust, traces of liquids, dyes or greasy residues are located on the surface. Furthermore, unfixed textile dyes can also have been incorporated in the material of the textile, wherein the unfixed textile dyes are able to dissolve from the material, for example, in a cleaning process such as washing. A soiling can also be understood as meaning such dissolved textile constituents as textile dyes.

In particular, garments, curtains or bedding are understood to be textiles. Garments and bedding comprise, for example, shirts, T-shirts, dresses, jackets, sweaters, pants, blankets, slips, and covers. The textiles can comprise various materials, for example, natural fibers, chemical fibers or other materials such as leather. A material type of the textile, can be, for example, the yarn of the textiles. Occasionally, for example, a textile which includes yarn as a material, is finished. In this case, a chemical modification of the yarn takes place, for example, to make the textile sturdier or the like. Such finished materials of textiles are also referred to as treated fibers.

A property of the soiling is understood in particular as meaning the color of the soiling, wherein the color of the soiling is determined in particular according to the principle of stain removal. In this case, for example, there can be a conclusion on the cause of the soiling based on the property of the color of a soiling, so that the probability of being able to remove the soiling by employing a suitable treatment is further increased. For example, soilings can be associated with certain colors, such as red soilings (for example, berries, lipstick, red wine, make-up, candle wax or the like), green soilings (for example, grass, copper rust, mold, spinach or the like), blue soilings (for example, ballpoint pens, stamping ink, ink or the like), yellow and brown soilings (for example, coffee, feces, rust, tobacco, tea, fruit or the like), and gray and black soilings (for example, graphite, iodine, coal, oil, carbon black, grease, shoe polish, or the like), to name but a few non-limiting examples.

The detection of the first image information item can be done, for example, by one or more optical sensor elements, such as by a camera.

The outline of the soiling is understood as meaning, in particular, the curve which delimits the soiling from its surroundings—the part of the textile not with the soiling and surrounding the soiling. In particular, the outline designates the outer line or totality of lines delimiting and surrounding the soiling, thereby setting the soiling apart from the textile.

By determining the soiling information item based at least in part on a first property, for example, the color of the soiling, and based at least in part on a second property, the outline of the soiling, there can be a much more accurate determination of the soiling. If the outline shows, for example, that there is an elongated soiling, for example, soiling caused by spinach is usually eliminated, since the outline is indicative of, for example, a pulling motion while the soiling was caused. Thus, for example, a soiling information item indicative of soiling caused by grass can be determined, although, for example, both grass and spinach are each green soilings. The soiling information item can comprise, for example, a composition of the soiling of the textile.

For example, by outputting or triggering an outputting of the soiling information item, the user can be provided with information item on the composition of the soiling of the textile, which advantageously contributes to the identification of the soiling. For example, information items about the chemical composition or about the occurrence of individual elements or compounds can be made available to the user. In particular, a further information item can be provided by a classification using the at least one output variable, for example, whether the soiling contains levels of certain organic or inorganic components, such as dyes or lipids, polysaccharides or proteins and, optionally, the origin of the soiling. For example, the soiling information item can provide the user with information items about a possible hygienic concern of the soiling.

In one embodiment of the method according to the first aspect, one or more of the following parameters i) to iv) can determine the property dependent on the outline of the soiling:
i) form of soiling;
ii) structure of the soiling;
iii) size of the soiling;
iv) contour of the soiling.

For example, the form of the soiling can be indicative of the external shape of the soiling. In particular, the form of the soiling can be indicative of the external shape of the soiling in its entirety. For example, the form of the soiling can be indicative of an annular outer shape, a frayed outer shape or a striped outer shape of the soiling, to name a few non-limiting examples.

For example, the structure of the soiling can be indicative of the surface of the soiling, such as a relief-like surface. For example, the structure of the soiling can be indicative of an essentially solid or an essentially liquid soiling. For example, the structure of the surface of a soiling caused by a lipstick is essentially thick on the textile and of a solid structure. In contrast, the structure of the surface of a soiling caused by, for example, blood is applied essentially thin on the textile.

For example, the size of the soiling is indicative of the size of the soiling relative to the size of the textile.

For example, the contour of the soiling is indicative of a uniformity of the contour line of the soiling, such as a smooth or frayed contour line, or even when multiple (at least two) contour lines are comprised by the soiling. A contour line is understood in particular as meaning that line by which the soiling is limited.

In an exemplary embodiment of the method according to the first aspect, the at least one property of the soiling of the textile is determined based at least in part on a property dependent on the color of the soiling.

In a further exemplary embodiment of the method according to the first aspect, one or more of the following parameters v) to x) can determine the property dependent on the outline of the soiling:
v) isotropy of the soiling;
vi) three-dimensionality of the soiling;
vii) color design of the soiling;
viii) color and/or color intensity homogeneity of the soiling;
ix) transparency of the soiling; and
x) gloss of the soiling.

For example, the isotropy of the soiling is indicative an independence of soiling from a direction that can be recognized by a causing of the soiling as a property of the soiling. For example, the soiling can be evenly colored over its entire area. In this case, the soiling is, for example, independent of one direction. On the other hand, if, for example, there is a color gradient from a darker coloration of the soiling to a lighter coloration of the soiling, this gradient can be detected as the direction of the soiling.

The direction independence of a soiling is also to be detected, for example, as a homogeneous structure of the soiling. The opposite, for example, can be anisotropy of the soiling.

For example, the three-dimensionality of the soiling is indicative of a thickness of the soiling. For example, the three-dimensionality of the soiling is indicative of a thickness of the soiling in the ratio of one part (for example, the center) of the soiling to the contour line of the soiling. As already stated, soilings arranged on a textile can differ significantly from each other in their applied thicknesses.

For example, the color design of the soiling can be indicative of a soiling composition. For example, it can be detected on the basis of the color design of the soiling, whether or not the soiling is composed of one or more substances.

However, for example, a color intensity homogeneity is opposite a color gradient from a darker coloration of the soiling to a lighter coloration of the soiling. The color intensity homogeneity is representative of, for example, saturation of the soiling, and/or a different intensity of the color of the soiling in different parts of the soiling, such as a difference in the intensity of the color of the soiling between the center of the soiling and the contour line of the soiling.

For example, the transparency of the soiling is indicative of a colorless soiling.

For example, the gloss of the soiling is due to the surface of a fabric being so smooth that indentations are smaller than the wavelength of visible light. For example, the gloss of the soiling is indicative of a greasy soiling. Gloss is also referred to as greasy shine, such as the gloss of greasy stains. For example, it can also be detected whether a dullness of the soiling is present—in contrast to a gloss of the soiling.

In an exemplary embodiment, the method according to the first aspect further comprises:
  determining at least one cleaning strategy parameter of the textile based at least in part on the determined soiling information item; and In a further exemplary embodiment, the method according to the first aspect further comprises:
  performing or causing the performance of a treatment of the textile corresponding to the at least one determined cleaning strategy parameter via at least one treatment device, in particular a cleaning device.

In particular, the cleaning strategy parameter is a recommendation for a specific treatment adapted to the soiling. For example, a particularly gentle treatment of the textile can be in the foreground, so that the at least one cleaning strategy parameter ensures the highest possible longevity of the textile. Likewise, a particularly intensive treatment of the textile can be desired, wherein the at least one cleaning strategy parameter is optimized with respect to the effect of the treatment of the specific structure, for example, the effectiveness of a cleaning process. Also, a recommendation about a particularly energy-saving treatment of the at least one cleaning strategy parameter can be represented. Furthermore, the combination of soiling and textile when determining the cleaning strategy parameter can be taken into account so that, for example, the soiling can be removed from the textile as efficiently as possible.

By determining at least one cleaning strategy parameter based on the soiling information item, it is possible, for example, to adapt the material wear when treating the textile according to the material wear in order to curb further increased material wear or, for example, also to remove the pillings in order to restore the appearance of the textile. The user can thus be given a recommendation about an optimum cleaning process with regard to the soiling present.

A conclusion can be drawn about the cleaning strategy parameter for a soiling via the soiling information item. In this case, the cleaning strategy parameter can be determined indirectly from a further output variable, for example, an output variable representative of the composition of the soiling is first determined and cleaning strategy parameters are determined from this output variable representative of the composition of the soiling. The cleaning strategy parameter can also be determined directly from the soiling information item, for example, by a classification via a stored soiling information item. This evaluation can be performed, for example, by a neural network, which is described in more detail below.

In particular, when a user of the textile cannot identify the soiling with the eye and it is therefore unclear how to remove the soiling again, the method according to the first aspect or the device according to the second aspect can provide a recommendation about an optimal cleaning strategy as a cleaning strategy parameter for the treatment of a textile. For example, it can be unclear to the user whether a soiling contains lipids or certain dyes that cannot be reliably removed via commonly used cleaning strategies. Additionally or alternatively, properties of the textile can also be taken into account. A recommendation can be made about a cleaning strategy adapted to the individual composition via the cleaning strategy parameters determined by the composition of the soiling and determined in the context of the method, the identification of corresponding ingredients of the soiling and/or a property of the textile. As a result, the removal of the soiling can be greatly simplified and made much more reliable.

It is also conceivable that substances dissolved from the material of the textile, for example, unfixed textile dyes, are detected as a soiling via the soiling information item. This happens in particular during the performance of a treatment, so that the user is given a conclusion on the effectiveness of the treatment of the textile. For example, the user can recognize whether an excessive amount of textile dyes dissolves from the material of the textile, whereby the user receives an incentive to change the cleaning strategy and, if necessary, to make it gentler with regard to the textile dye. Likewise, a decolorization of a textile can be intended and a conclusion about the degree of decolorization can be drawn regarding the at least one output variable by a cleaning strategy.

An exemplary embodiment provides that the particular cleaning strategy parameter represents one or more of the following parameters a) to g):
a) cleaning agent type;
b) amount of cleaning agent;
c) cleaning temperature;
d) type of cleaning device;
e) one or more settings of the cleaning device;
f) recommendation of pretreatment of the soiling; and
g) recommendation to perform a special treatment.

In particular, the cleaning strategy parameter is indicative of a cleaning agent type, an amount of cleaning agent, a cleaning temperature, a type of cleaning device, one or more settings of the cleaning device, recommendation of a pretreatment of the soiling, recommendation of performing a special treatment, or a combination thereof.

Cleaning agents are used, for example, in the household for the cleaning of different objects. For example, a cleaning agent, for example, a washing agent, for washing machines is used for cleaning textiles. However, a cleaning agent should likewise also be understood as meaning cleaning auxiliaries or cleaning additives, for example, a bleaching additive, a fabric softener or laundry starch. A cleaning agent can also be a liquid, a dispersed system, for example, a gel or foam, or a solid, in particular, a tab, powder or granules.

A cleaning agent can, for example, have one or more components from the group of components comprising surfactants, alkalis, builders, grayness inhibitors, optical brighteners, enzymes, bleach, soil release polymers, fillers, plasticizers, perfumes, dyes, conditioners, acids, starch, isomalt, sugar, cellulose, cellulose derivatives, carboxymethylcellulose, polyetherimide, silicone derivatives and/or polymethylimines.

A cleaning agent can further comprise one or more other ingredients. These ingredients comprise, but are not limited to, the group of bleach activators, chelants, builders, electrolytes, nonaqueous solvents, pH adjusters, perfume carriers, fluorescers, hydrotropes, silicone oils, bentonites, antiredeposition agents, anti-wear agents, anti-wrinkle agents, dye transfer inhibitors, anti-microbial active substances, germicides, fungicides, antioxidants, preservatives, corrosion inhibitors, anti-static agents, bittering agents, ironing auxiliaries, repellents or impregnating agents, swelling or slipping agents and/or UV absorbers.

The cleaning strategy parameter can represent the cleaning agent type and thus be indicative of the composition of the cleaning agent. For example, if some level of dye is contained in the composition of the soiling, the use of certain bleaching additives can be recommended to the user. For example, if certain levels of lipids are present in the composition of the soiling, the use of specific surfactants and/or lipases can be included in the recommended cleaning strategy.

The cleaning strategy parameter can represent the amount of cleaning agent and, in particular, indicate an absolute amount of the cleaning agent. Likewise, a relative amount of the cleaning agent can be displayed by the cleaning strategy parameter, for example, based on the mass of the textiles to be cleaned or a bath ratio or an amount of cleaning agent based on a water volume to be used for cleaning. A cleaning agent type and/or an amount of cleaning agent can thus be determined which ensures an optimum removal of the soiling via the intensity information item dependent on the composition of the soiling.

An optimal temperature for removing the soiling can be indicated for the determined composition of the soiling using a cleaning strategy parameter representative of the cleaning temperature, in particular in combination with a cleaning agent type. On the one hand, the cleaning temperature can be high enough to ensure that the soiling is removed as completely as possible and, on the other hand, kept low in terms of energy consumption and protection of the textile.

As a result, the removal of the soiling can be greatly facilitated for the user using the cleaning strategy parameter.

In particular, in the case of soilings which cannot be identified with the eye, an optimum cleaning strategy with regard to cleaning, but also to energy consumption and the protection of the material of the textile can be recommended via the method. For example, the recommendation of the cleaning agent type and the settings of the cleaning device comprises whether the intensity information item indicates a certain content of lipids in the soiling and therefore corresponding fat-dissolving components should be included in the cleaning agent or whether certain dyes are present in the soiling, which can be specifically attacked via a specific cleaning agent type and settings of the cleaning device.

In an exemplary embodiment according to the first aspect, the method further comprises:

performing or causing the performance of a treatment based at least in part on the cleaning strategy parameter by a cleaning device.

A cleaning device is understood in particular as meaning a washing machine, in particular automatic household washing machine. In this case, a cleaning strategy parameter can indicate a certain type of such a cleaning device. It is also conceivable that the cleaning strategy parameter at least partially simulates cleaning strategies to be performed manually, such as a hand washing. Also, the cleaning strategy parameter can comprise settings of a cleaning device, for example, a program of an automatic household washing machine or a sequence of such programs.

A recommendation of performing a special treatment is understood as meaning, among other things, that it is recommended that the soiling be removed by cleaning or laundry using non-household methods (for example, with suitable stain removing agents) in a fabric-friendly manner.

The cleaning strategy parameter can represent, for example, a treatment of the textile. A treatment, for example, can comprise a pretreatment of the soiling of the textile and/or the textile. For example, this can comprise a pre-cleaning, an application of pretreatment agents or a certain arrangement of the textile. For example, the cleaning strategy parameter indicates a pre-cleaning or pre-washing, in particular a soaking of the textile in a certain solution or a pre-cleaning program of a cleaning device. Various pretreatment agents can be provided for manual or automatic application, for example, the application of a stain remover or bleach is indicated. Furthermore, an arrangement of the textile can be given in particular in that the textile should be turned "on the left" before the actual treatment or arranged in another device, for example, in a laundry bag. Furthermore, the pretreatment can also comprise closing the closure feature, for example, the user can receive an indication of closure of a zipper for subsequent treatment.

It can be provided, for example, that the textile is dyed or is subjected to a gentle treatment as a treatment of the textile. In an advantageous embodiment of the method according to the first aspect, the treatment comprises a cleaning treatment, in particular a washing treatment performed on a cleaning device, for example, a washing machine.

In particular, the method further comprises performing the treatment by a cleaning device.

In this case, the soiling information item can be determined before, and a further soiling information item during and/or after performing the treatment of the textile. With a determination prior to cleaning, for example, a recommendation about the cleaning strategy to be used can be given to the user before a cleaning treatment to be performed.

When determining the soiling information item during the cleaning, the cleaning can be performed dynamically, for example, that is, a cleaning device can adapt to the just determined soiling information item (sometimes changed) during the cleaning, in particular in which the output variable is determined continuously. For example, during the washing program, a washing machine adjusts, for example, the temperature or the amount of cleaning agent according to the determined soiling information item. In particular, the soiling information item of textile components dissolved from the textile such as textile dyes can be obtained here.

By determining the soiling information item after a cleaning, for example, the result or the effectiveness of a treatment can be recorded and checked.

The soiling information item and/or the cleaning strategy parameter can be output to the user on a display or a corresponding output can be triggered. The user can then perform the treatment of the textile. Alternatively or additionally, in one embodiment of the method, the soiling information item and/or the cleaning strategy parameter can be output to a cleaning device. For example, the soiling information item and/or the cleaning strategy parameter can be output to the cleaning device, so that the cleaning device, for example, adopts the corresponding treatment as default and the user merely has to start the cleaning device. It is also conceivable that the cleaning device automatically performs the treatment with the output of the soiling information item and/or the cleaning strategy parameter. For example, the cleaning device can have a dosing device for cleaning agent to automatically provide the cleaning agent type and amount of cleaning agent according to the recommended treatment of the textile. The user friendliness of the method is thereby improved as a result.

In an exemplary embodiment according to the first aspect, the method further comprises:

determining a property information item of the textile, wherein the property information item of the textile is indicative of at least one property of the textile, wherein the at least one cleaning strategy parameter is determined based at least in part on the determined property information item.

A further embodiment according to the first aspect provides that the at least one property of the textile is indicative of material structure, material type, material distribution, material wear of the textile, color of the fabric of the textile, form of the fabric of the textile, or a combination thereof.

The determination of the property information item can be performed, for example, based at least in part on the detected first image information item in the case where at least a part of the detected first image information item is indicative of at least a part of the textile. Usually, the detected first image information item also represents at least a part of the textile in addition to the soiling and thus can be used directly for determining the property information item of the textile. Alternatively or additionally, a third image information item can be detected, wherein the determination of the property information item can be performed based at least in part on this third image information item. The third image information item is, for example, indicative of at least a part of the textile. The detection of the first image information item can be done, for example, by one or more optical sensor elements, such as by a camera.

In one embodiment of the method according to the first aspect, the material structure, the material type, the material distribution, the material wear of the textile, the color of the fabric of the textile, the form of the fabric of the textile or a combination thereof can be detected, for example, for detecting at least one part of the textile.

The material structure of the at least one part of the textile is understood in particular as meaning the type and/or shape of a fabric, a knit textile or nonwoven textile or batt. In this case, the intensity information item can in particular be characteristic of the type of interweaving of fibers, as produced, for example, via weaving, knitting, or characteristic of a nonwoven textile. In this case, a splice pattern and a thread cross-over pattern and a thread weave can be represented by the intensity information item. Yarn density, fiber thickness, fiber length, fiber fineness and/or fiber orientation can be detected in particular in the intensity information item. The material structure of the at least one part of the textile has a direct effect on the requirements for the treatment of the textile, for example, a nonwoven fabric can have different cleaning treatment requirements than a knitted or woven structure.

The material type is understood in particular as meaning the composition of at least part of the material of the textile. For example, the intensity information item is indicative of natural fibers, chemical fibers or natural materials such as wool or leather in the textile, coating of the fibers, textile finishing. The material type also has a significant effect on an optimal treatment of the textile, shackle thickness or soil release polymers, such as a cleaning treatment or a shackle.

Using the material distribution of the textile, it can be detected, for example, whether the textile has a mixed fabric of different fiber types or fiber materials and/or whether partial regions of the textile are made of a different material. In this case, the ratio of the different materials to each other, for example, a density ratio, mass ratio or area ratio, can be detected. Further represented by the intensity information item can be the type and number of connection points, for example, seams, welds or adhesive points.

Using the property information item of the textile representative of the material wear, it can be recorded in particular whether there are pillings, cracks, holes, wear or other structural damage to the textile. In particular, for pillings, which arise by a loosening of fibers from the textile composite and occur in the form of knots on the textile surface, the type, shape, size or height, number and/or distribution of the material wear can be detected.

In a further embodiment of the method according to the first aspect, the property information item of the textile can be representative, for example, of the presence and/or type of closure feature, of coating material and/or of applications in, at and/or on the at least one part of the textile.

Closure features on the textile are understood in particular as meaning zippers, hook-and-loop fasteners, buttons or similar arrangements, which are in particular configured to create a connection of parts of the textile via a positive connection and which can be designed detachable.

The at least one part of the textile can have one or more coating materials, in particular the fibers are coated or a coating is applied to the structure of the material of the textile, for example, on the fabric. The coating can be, for example, a functional layer such as a protective layer, sealing layer, or finishing layer of the textile or can alter the look or feel of the textile. In particular, the protective layer or the sealing can be arranged as an additional layer on the finishing layer of the textile.

Textiles, in particular garments, can further have applications such as imprints, sequins, lace, patches or the like, which can also be represented by the intensity information item. Likewise, functional textiles can have functional elements as applications or electronic elements can be arranged in the textile or on the surface of the textile.

If at least one part of the property information item of the textile represents such closure feature, coatings and/or applications on the textile, care can also be taken to protect the corresponding elements during treatment. On the one hand, a wear of such closure feature, coatings and/or applications can be reduced during a treatment and on the other hand, for example, a detachment of coatings or applications can be avoided.

In an exemplary embodiment of the method according to the first aspect, the at least one cleaning strategy parameter is determined by a neural network, in particular an artificial neural network, wherein in a first step, a classification of the soiling takes place based at least in part on the determined soiling information item or based at least in part on the determined soiling information item and the determined property information item of the textile, and in a second step, the cleaning strategy parameter is derived based at least in part on the classification of the soiling.

The neural network can, for example, be an artificial system (for example, a device according to the second aspect or a system according to the third aspect) that learns, for example, from training cases as examples and can generalize them after the end of the learning phase. That is, the examples are not simply learned by heart, but rather patterns and principles are recognized in the learning data. Different approaches can be followed for this purpose. For example, supervised learning, partially supervised learning, unsupervised learning, empowered learning, and/or active learning can be used. Supervised learning can be done, for example, by an artificial neural network (such as a recurrent neural network) or by a support vector machine. Unsupervised learning can also take place, for example, by an artificial neural network (for example, an auto-encoder). For example, the repeatedly obtained and/or determined intensity information items or the specific output variables serve as learning data.

Alternatively or additionally, it is conceivable that the detected first image information item or the detected first image information item and a detected second image information item or the determined soiling are associated with further information items, for example, with the number and/or the respective age of the persons of a household for creating a personal soiling profile or for example, with the season for the creation of a seasonal soiling profile.

It is also possible that multiple instances of obtaining and/or detecting the first image information item or the first image information item and a second image information item or determined soiling information items are used for a machine learning. For example, the soiling profile can be determined, at least in part, based on machine learning.

The reliability of the determination of the soiling information item and in particular the treatment of the textile, in particular for the removal of the soiling from the textile, can be increased by these measures.

Each of the training cases, for example, can be given by an input vector, an image information item, for example, the first image information item or the first image information item and a second image information item, and an output vector of the artificial neural network. The output vector is given, for example, by substance concentrations determined by chemical analysis within this soiling of a textile belonging to the training case and/or a part of the textile.

Each test case can be generated, for example, by converting the soiling of a textile belonging to the training case and/or part of the structure of a textile into a predetermined state (for example, defined soiling on a defined textile) and subsequently generating a soiling information item representative of a soiling, and at the same time performing a chemical analysis to measure the substance concentration (for example, the soiling on the textile and/or of the textile).

The determined soiling information item is transmitted, for example, as an input vector, the substance concentration as an output vector of the training case.

For example, the calibration can be done by a neural network. In this case, for example, an error feedback in the neural network, a so-called back propagation, is done. In this case, for example, the parameters used to determine the soiling information item which the neural network uses are optimized. With the optimized parameters, the neural network is suitable, for example, for meaningfully determining output vectors (output variables, in particular for the determination of a soiling information item) from input vectors (first image information item for at least one soiling on a textile, or first image information item for at least one soiling on a textile and second image information item indicative of at least the soiling on the textile from the opposite side of the textile detected as the first image information item) which deviate from the originally learned input vectors of the training cases. Accordingly, for example, the parameters are adaptive, so that a calibration can be performed using the already known (for example, stored in a database) parameters.

In an exemplary embodiment, it is provided that, for example, a soiling of a textile and/or at least one part of a structure of a textile, in particular a stain and/or a textile type, is recognized by, for example, an image processing unit in a detected first image information item and/or second image information item, and a plurality of input vectors is formed from those parts of the detected information items that are associated with the soiling of the textile and/or the at least one part of the textile. In this case, for example, an input vector of the neural network can be formed from each of the image points associated with this soiling of the textile and/or with the at least one part of the textile (for example, a pixel which is comprised in the intensity information item). The components of such an input vector are given by the intensity values of the image point respectively represented by the respective image information item. Furthermore, a chemical analysis can be performed, for example, with regard to the soiling of the textile and/or the at least one part of the textile. The associated result can, for example, form the output vector. Subsequently, for example, the neural network can combine each of the input vectors with the output vector. In this way, a plurality of training cases can be generated from the soiling of the textile and/or the at least one part of the textile (for example, a training case in particular for each detected image point of the intensity information item).

In an exemplary embodiment, at least one image point within the detected first image information item and/or second image information item is used as a fixed predetermined reference image point for a spectral exposure compensation of the image, wherein image data from image points of the image that are different from the at least one reference image point are normalized using image data of the at least one reference image point.

An exemplary embodiment provides that the neural network performs a spectral exposure correction of the detected first and/or second image information item. For example, an instantaneous exposure condition of the soiling of the textile and/or the at least one part of the textile can be detected (for example, measured) and compensated for by a normalization of the image points of the first and/or second information item almost simultaneously. The spectral composition of the information items (for example, image data) of these image points is also normalized by the spectral exposure compensation in addition to the exposure intensity of individual image points of the spectral image.

The exposure conditions are usually determined by incident light and the angle of incidence of the light on the soiling of the textile and/or the at least one part of the structure of the textile.

It can be provided in the spectral exposure compensation, for example, that within the image region comprised by the intensity information item with the soiling of the textile and/or the at least one part of the textile, a body is detected whose surface has, for example, predetermined, in particular optical properties. For example, one of the properties can be a particular color or gray scale and/or brightness. For example, this body is formed flat. For example, this body is firmly connected to a treatment device, in particular a cleaning device (for example, washing machine) and/or is a direct part of its surface (for example, a painting). In the case where the image information items from which the spectral image represented by the intensity information item are reconstructed is detected by an optical element, for example, the body can always be arranged in a same position relative to the optical element so that the body is always comprised in the same image region of the detected image information items.

In an exemplary embodiment, at least one predetermined image point (also referred to as a reference image point) of the detected image information item can be used for the spectral exposure compensation. The reference image point of the detected image information item is, for example, on the body with predetermined surface properties. For example, the remaining detected image points of the image information item can be normalized based on the reference image point. To avoid unnecessary computational effort, for example, only those image points that comprise the soiling of the textile and/or the at least one part of the structure of the textile can be normalized.

In an exemplary embodiment, the spectral exposure compensation can be performed by the neural network. For example, it can be provided that a layer of the neural network performs the spectral exposure compensation. The spectral exposure compensation can also be performed, for example, at regular intervals, in particular automatically. Time-varying exposure conditions can be normalized in a timely manner ('real-time'). In the case where an optical element is used for detecting the image information items, which optical element is not fixedly arranged, as is the case for example, with an electronic device (for example, a smart phone, tablet or the like), for example, the movement of the optical sensor can change the exposure conditions of the detected image information items. Accordingly, for example, a spectral exposure compensation performed at regular time intervals can compensate for these different exposure conditions.

In an exemplary embodiment of the method according to the first aspect, the image information item is detected by one or more sensors, in particular by one or more optical sensor elements.

The one or more optical sensor elements can be formed, for example, as one of the following features:
(i) camera, in particular a 3D camera or hyperspectral camera;
(ii) LED sensor element (for example, photodiode); and
(iii) NIR (near infrared) sensor element.

In this case, an optical sensor element or an optical sensor is understood as meaning sensors which can determine an intensity of incident radiation, in particular electromagnetic radiation in the visible range and optionally beyond. In particular, the optical sensor element is configured to provide an energy resolution and/or spatial resolution of the intensity information item. The optical sensor element can comprise an image sensor, in particular a digital image sensor. In particular, at least one semiconductor element, diode, CCD element, for example, a Bayer sensor, or CMOS element, for example, a sensor of the type Foveon X3, can be used to determine the incident radiation. The optical sensor element can contain optical filters and in particular a spectrometer. Also conceivable is the use of monochrome sensors without color resolution. Likewise, sensors can be used which are limited to certain wavelength ranges. For example, the optical sensor can be based on at least one photodiode and/or at least one LED sensor element. Individual elements or arrays of elements, such as photodiodes or photosensitive components such as LEDs can be used. It can be advantageous to optimize the size of the individual sensor elements, for example, the individual photodiodes, in terms of dynamics, resolution and/or sensitivity.

In one embodiment, the optical sensor element provides a three-dimensional spatial resolution. With a three-dimensional spatial resolution, the accuracy of determining the soiling information item can be further increased based at least in part on the detected first image information item or the detected first image information item and the detected second image information item and/or a detected information item of at least a part of the textile. It is conceivable to use a plurality of images from different perspectives via the same optical sensor element or the same sensor arrangement. Likewise, optical elements formed specifically for a three-dimensional resolution, such as attachment lenses or objective lenses can be provided, or a 3D camera can be used. Additional optical elements, for example, attachment lenses or objective lenses, can also be arranged on conventional, essentially two-dimensional optical sensors, for example, digital cameras or cameras integrated into mobile devices. Already existing devices can thus be retrofitted for a three-dimensional resolution. Using the three-dimensional resolution, for example, textile structure, for example, the shape and arrangement of the fabric, the mesh or the nonwoven textile, and/or the shape and arrangement of a soiling (for example, within) the textile can be determined in more detail and thus a more comprehensive and accurate intensity information item can be obtained.

In one especially simple embodiment, the at least one optical sensor element comprises at least one camera-like element and provides an image information item. Accordingly, digital cameras or cameras integrated into electronics (for example, mobile devices) can be used for the method or serve as at least one device for performing the method. In this case, attachments for a three-dimensional spatial resolution can be used on the camera-like element.

In one embodiment, the one or more sensors are formed as a hyperspectral camera. Such cameras scan a range of wavelengths, for example, from about 400 to about 1000 nanometers over a plurality of channels and detect an image information item based thereon. Further, hyperspectral cameras can additionally scan the infrared range with wavelengths of from about 1000 to about 2500 nanometers. Thus, hyperspectral cameras not only scan the visible range of light but also a range far beyond. As a result, such cameras provide a spectral image by which certain soilings can be recognized. A possible treatment of the soiling of the textile can then be derived from these information items.

For example, the one or more sensors comprise at least one CMOS element having a maximum sensitivity in the near infrared (NIR) range. This is referred to below as an NIR sensor element. In this case, an illumination with radiation in the NIR range is advantageous. The NIR range is understood as meaning a wavelength range of the electromagnetic spectrum of at least 750 nm, in particular up to a maximum of 2000 nm, in particular of at least 800 nm to a maximum of 1400 nm. An image information item is hereby detected.

The one or more optical sensor elements can, for example, detect a photograph, a spectral image, a fluorescence spectral image, a differential spectral, a change of response as an image information item, to name a few non-limiting examples.

In an exemplary embodiment of the method according to the first aspect, the method further comprises:
 detecting a second image information item indicative of at least the soiling on the textile, wherein the second image information item detects the opposite side of the soiling relative to the first image information item, wherein the at least one property is determined based at least in part on the detected first and second image information item, Accordingly, for example, the front and the back sides of the soiling on the textile are detected by the image information items. For example, the soiling information item is determined based at least in part on this.

In an exemplary embodiment of the method according to the first aspect, the determination of the soiling information item comprises a comparison of the detected first image information item or the detected first and the second image information item with comparison values.

For example, sometimes existing differences in soiling between the front and back sides of the textile can be detected. For example, a soiling of red wine spreads evenly through the textile and is accordingly recognized as homogeneous both on the front and on the back sides of the textile. This can be determined in determining the soiling information item based at least in part on the detected first and second image information item. On the other hand, a soiling, for example, caused by lipstick on the front side of the textile on which the soiling was applied to the textile, can show more significantly than on the back side, since the soiling does not diffuse so strongly through the textile. Detecting occasional existing differences between the side of the textile on which the soiling has been applied when it was caused and the opposite side of the soiling can be done, for example, using the neural network.

Accordingly, an exemplary embodiment provides that the determination of the soiling information item comprises a comparison of the detected first image information item or the detected first and the detected second image information item with comparison values.

For example, the comparison can be made with comparison values. Corresponding comparison values can be stored in a database. The detected first image information item or the detected first and the detected second image information item can be subjected to a classification, for example, wherein the soiling information item is obtained or influenced by a result of the classification. A classification can be based, for example, on a comparison of the detected first image information item or the detected first and the detected second image information item with a database of already known image information items, which are associated, for example, with a specific soiling. A corresponding classification can be done, for example, additionally or alternatively with the neural network. In particular, a neural network as described in this specification can be used here.

The comparison values or a database provided for this purpose can in particular contain soiling information items of typical soilings occurring in the fields of application of the textiles. These can be represented, for example, by the training cases. These can then be used by the neural network to determine a soiling information item. For example, in the household sector, soiling information items of typical soilings can be accessed, such as various food residues, traces of beverages, grass or colors. The soiling information items of the database can be associated with certain further information items, for example, at least one information item for removing the soiling.

For example, should the determined soiling information item not be unambiguously attributable to a soiling, for example, an input of information item of a user can be captured, wherein the input of the user is indicative of a specification of the soiling.

For example, one or more such inputs of the user can be detected, if that makes sense. This can be done in the context of an interaction with the user, if, for example, after a first input of an information item of the user, no clear result of soiling can be determined. For example, the user can be asked, in his opinion, where the soiling came from. For example, the site and/or location (for example, whether the soiling is indoors or outdoors, for example, in the garden) can have its origin. In this way, for example, the user can obtain a decisive indication by entering the information item in order to be able to determine the soiling information item.

In an exemplary embodiment of the method according to the first aspect, the method further comprises the following method step:

detecting at least one voice command indicative of at least one parameter, on the basis of which the soiling information item is determined.

The voice command can be input, for example, by a user, for example, via a voice communication interface (for example, an electronic device comprising a microphone or the like). The input voice command in this case can be processed, for example, locally on the part of the voice communication interface or on the part of a server. For processing on the part of a server, the voice command can be transmitted to a server, for example, after input via a communication connection of the electronic device. The input voice command can be processed, for example by a speech recognition software (for example, Apple Siri or Amazon Echo). This can require the installation of additional software. For example, a voice command processed in this way can be converted into a control information item which the device, for example, an electronic device, and/or a further electronic device (for example, a cleaning device) can, for example, evaluate, process, forward, or otherwise use. For example, a corresponding control information item can be taken into account in determining the soiling information item.

In one exemplary embodiment of the present disclosure according to all aspects, a status information item is obtained (for example, determined). The status information item can be output, for example, or its output can be caused.

For example, in a system, for example, each cleaning device can have a wireless communication interface (for example, WLAN, WAN, Zigbee, Bluetooth, to name but a few examples) for the transmission of a status information item. For example, the status information item can be transmitted based on a query to a home appliance controller centrally installed in the household (for example, a desktop computer, a central control unit, a server, a home automation system), and/or a (for example, mobile) smart device (such as a smart phone, a tablet, a smart watch, to name just a few examples). The status information item can be output, for example, displayed on a display device of the smart device to the user.

For example, the status information item can be indicative of a cleaning and/or care action. Alternatively or additionally, the status information item can be indicative of a progress, cancel, completion, start, or a further status of a cleaning process. Alternatively or additionally, the status information item can be indicative of properties of the soiling and/or the structure of the textile.

According to the second aspect of the present disclosure, an alternative device is also described, comprising at least one processor and at least one memory having computer program code, wherein the at least one memory and the computer program code are configured to execute and/or to control at least one method according to the first aspect with the at least one processor. For example, a processor is understood as meaning a control unit, a microprocessor, a microcontrol unit such as a microcontroller, a digital signal processor (DSP), an application specific integrated circuit (ASIC), or a field programmable gate array (FPGA).

For example, an exemplary device further comprises features for storing information items such as a program memory and/or a main memory. For example, an exemplary device as contemplated herein further comprises features for receiving and/or sending information items over a network, such as a network interface. For example, exemplary devices as contemplated herein are connected to each other and/or connectable to each other via one or more networks.

An exemplary device according to the second aspect is or comprises, for example, a data processing system that is configured in terms of software and/or hardware in order to be able to execute the respective steps of an exemplary method according to the second aspect. Examples of a data processing system include a computer, a desktop computer, a server, a thin client and/or a portable computer (mobile device), such as a laptop computer, a tablet computer, a wearable, a personal digital assistant or a smart phone.

Individual method steps of the method according to the first aspect (for example, obtaining or determining an intensity information item, determining the at least one output variable) can in this case be performed using a sensor device which also has at least one sensor element. Likewise, individual method steps (for example, obtaining or determining intensity information items, determining the at least one output variable), which, for example, need not necessarily be performed directly with the sensor device, can be made by a further device, which in particular communicates with the device which has at least one sensor element via a communication system.

Further devices can be provided, for example, a server and/or, for example, a part or a component of a so-called computer cloud, which provides data processing resources dynamically to different users in a communication system. A computer cloud is understood, in particular, as meaning a data processing infrastructure as defined by the National Institute for Standards and Technology (NIST) for the English term "cloud computing". An example of a computer cloud is a Microsoft Windows Azure Platform.

According to the second aspect of the present disclosure, there is also described a computer program comprising program instructions that cause a processor to execute and/or control a method according to the first aspect when the computer program is run on the processor. An exemplary program as contemplated herein can be stored in or on a computer-readable storage medium containing one or more programs.

According to the second aspect of the present disclosure, there is also described a computer-readable storage medium containing a computer program according to the second aspect. A computer-readable storage medium can be formed, for example, as a magnetic, electrical, electro-magnetic, optical and/or other type of storage medium. Such a computer-readable storage medium is preferably graphical (that is, "touchable"), for example, it is formed as a data carrier device. Such a data carrier device is for example, portable or permanently installed in a device. Examples of such a data carrier device are volatile or non-volatile random access memory (RAM) such as NOR flash memory or having sequential access such as NAND flash memory and/or read-only access memory (ROM) or read-write access. For example, computer readable is to be understood as meaning that the storage medium can be read and/or written by a computer or a data processing system, for example, by a processor.

According to the third aspect of the present disclosure, there is also described a system comprising a plurality of devices, in particular, a mobile device and a cleaning device, which together perform a method according to the first aspect.

An exemplary system according to the third aspect comprises an exemplary cleaning device and additionally a further device, for example, a mobile device or a server for performing an exemplary method according to the first aspect.

The exemplary embodiments of the present disclosure described above in this description are also to be understood as being disclosed in all combinations with one another. In particular, exemplary embodiments are to be understood in terms of the different aspects disclosed.

In particular, the preceding or following description of method steps according to preferred embodiments of a method also discloses corresponding features for performing the method steps by preferred embodiments of a device. Likewise, by the disclosure of features of a device for performing a method step, the corresponding method step is also disclosed.

Further advantageous exemplary embodiments of the present disclosure can be found in the following detailed description of some exemplary embodiments of the present disclosure, in particular in conjunction with the figures. However, the figures should only serve the purpose of clarification, not, however, to determine the scope of protection of the present disclosure. The figures are not to scale and are merely intended to exemplify the general concept of the present disclosure. In particular, features included in the figures should by no means be considered as a necessary component of the present disclosure.

The exemplary embodiments described above in this description are also to be understood as being disclosed in all combinations with one another. In particular, exemplary embodiments are to be understood in terms of the different aspects disclosed.

BRIEF DESCRIPTION OF THE DRAWINGS

The present disclosure will hereinafter be described in conjunction with the following drawing figures, wherein like numerals denote like elements and.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

Figure 1A:
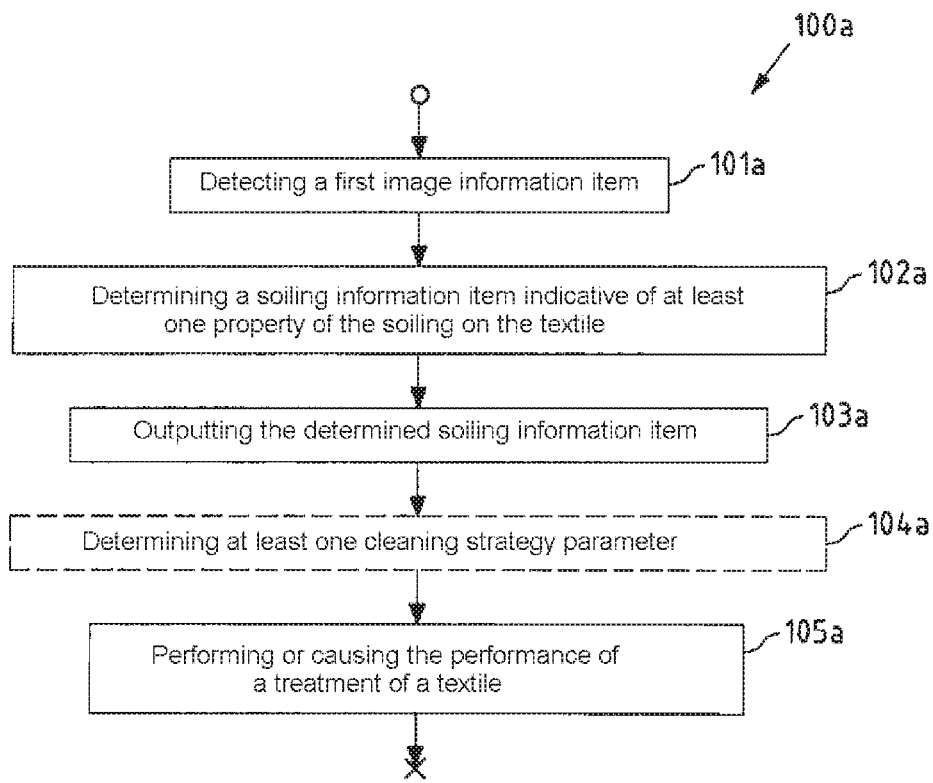
FIGS. 1a-c are flow charts of an embodiment according to a method of the first aspect.
Figure 1B:
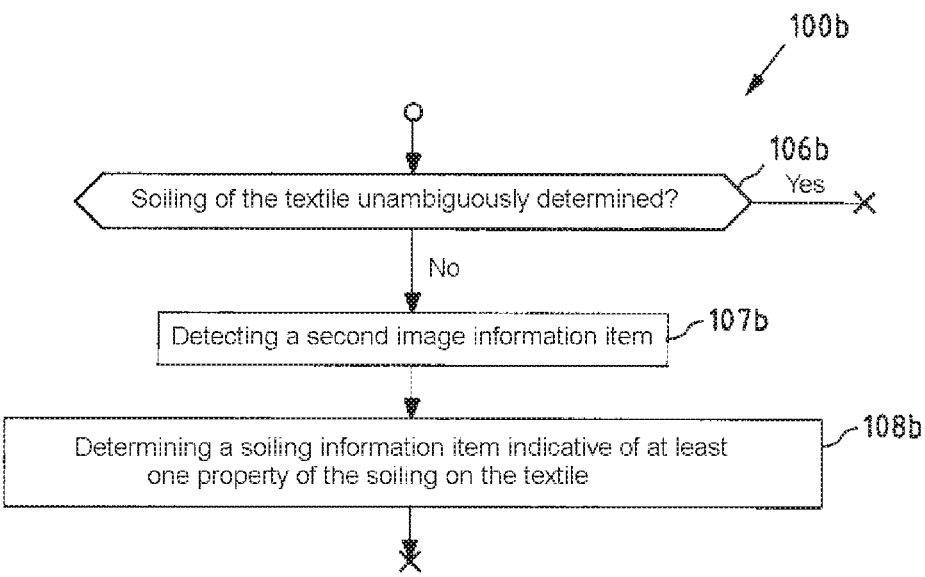
Figure 1C:
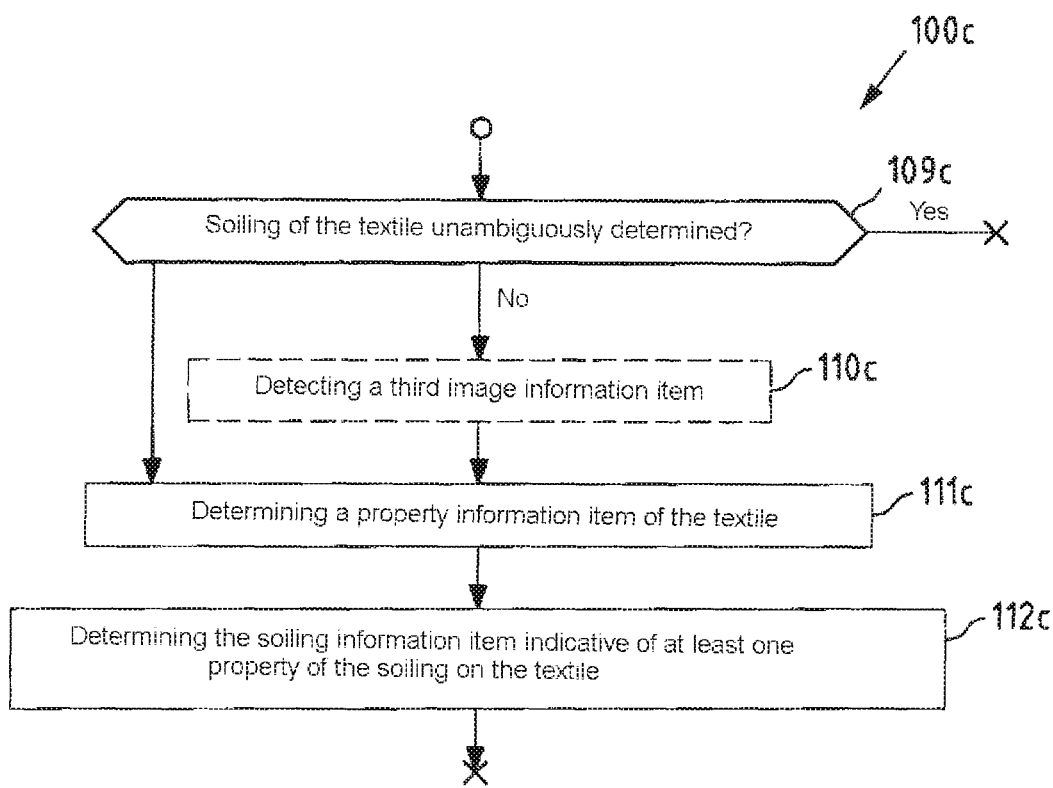

FIG. 1a to FIG. 1c each show a flow chart of an embodiment according to a method according to the first aspect. The respective flowcharts 100a, 100b and 100c can be executed and/or controlled, for example, by a device according to the second aspect of the present disclosure, or by a system according to the third aspect of the present disclosure. The device according to the second aspect of the present disclosure, or one of the several devices of the system according to the third aspect of the present disclosure, in particular at least one mobile device and a cleaning device, can each execute and/or control one, several or all of the steps illustrated in the flowcharts 100a, 100b and 100c.

The device according to the second aspect of the present disclosure, or one of the several devices of the system according to the third aspect of the present disclosure can be formed, for example, as a smartphone or smartwatch or another mobile terminal. Also conceivable is an add-on system, for example, comprising one or more sensor elements for a device and/or permanently installed systems, wherein the add-on system can be coupled to the device and/or the permanently installed system, in particular can be coupled via a (for example, wireless and/or wired) communication link. Additionally or alternatively, the device can be formed as a cleaning device (for example, a washing machine). The cleaning device can comprise, for example, the one or more sensor elements with which, for example, the first image information item can be detected. Further, the device according to the second aspect of the present disclosure, or one of the several devices of the system according to the third aspect of the present disclosure, can be formed as a smart pen, wherein the smart pen comprises features for executing or controlling the method according to the first aspect of the present disclosure. The smart pen can be coupled, for example, to a cleaning device, for example, via a wired or wireless communication link. For example, it is also possible for the cleaning device to comprise a power supply, by means of which the smart pen can be supplied with electrical energy.

Features for executing the method according to the first aspect of the present disclosure can, for example, also be comprised in a cleaning device, such as a cleaning robot, wherein the cleaning robot in particular comprises at least one communication interface for communication with one or more further devices. The device according to the second aspect of the present disclosure, or one of the several devices of the system according to the third aspect of the present disclosure, for example, can be a controller centrally installed in the household, such as a home appliance controller or the like.

A first image information item is detected in step 101a. The first image information item is indicative of at least one soiling on a textile. The detection of the first image information item can be done, for example, using one or more sensor elements (for example, a camera). For example, the soiling of the textile (for example, soiling 302 of the textile 304 according to FIG. 3) is detected using a camera 308 of a mobile terminal 306 according to FIG. 3, or using a camera 332 according to FIG. 3 arranged on the determination device 330 or even using a camera (for example, camera 326 of the cleaning device 320 according to FIG. 3) comprised in a cleaning device. In the case where, for example, the illumination for detecting the first image information item is not sufficient (for example, in a darker laundry room), in one embodiment, a flashlight (for example, flashlight 310 according to FIG. 3) or even a display device of the device (for example, display device 312 according to FIG. 3) can be used to illuminate the soiling on the textile before or during the detection of the first image information item.

In step 102a, a soiling information item indicative of at least one property of the soiling on the textile is determined. The at least one property is determined based at least in part on the detected first image information item. The at least one property of the soiling of the textile is in this case determined based at least in part on a property dependent on the outline of the soiling. Accordingly, the first image information item detected in step 101a is representative of the entire soiling, not just part of the soiling. Since soilings on textile usually occupy a significantly smaller area on the textile than the total area of the textile, it is usually no problem to detect the soiling in its entire size as a first image information item.

For example, the detected soiling information item represents the composition of the soiling, so that, for example, information items stored in a database for removing the soiling from the textile can be made available to a user, for example. To do so, in step 103a, there is an outputting or a causing of outputting of the determined soiling information item, for example, to a further device (for example, a server 316 according to FIG. 3). Based at least in part on the soiling information item, the further device can request, for example, the aforementioned information items.

In an optional step 104a, at least one cleaning strategy parameter is determined based at least in part on the soiling information item determined in step 104a. The cleaning strategy parameter comprises, for example, a type, amount, or the like of a cleaning agent optimally suited for removing the soiling on the textile. Accordingly, in the optional step 105a, there can be a performing or a causing of the performance of a treatment of the textile.

For example, in the case where the soiling on the textile can not be determined unambiguously based at least in part on the detected first image information item, further steps for detecting (further) properties of the soiling can be performed. Further exemplary details are described in connection with FIGS. 1b and 1c.

In the case where the soiling on the textile can not be determined unambiguously, as is checked, for example, in step 106b, a detection of a second image information item can be done in step 107b. For example, the second image information item is detected from the opposite side of the soiling on the textile compared to the first image information item.

Accordingly, for example, the front side and the back side of the soiling on the textile are detected by the first and second image information item. The at least one property of the soiling is determined, for example, based at least in part on the detected first and the detected second image information item. The detection of the second image information item can reveal a further property associated with the soiling on the textile, for example, whether or not the soiling has spread through the textile. For example, low viscosity substances are more prone to spreading in the textile so that such soilings are visible on both the front side and back side of the textile. The detection of the second image information item can be done, for example, using one or more sensor elements (for example, a camera). For example, the soiling of the textile (for example, soiling 302 of the textile 304 according to FIG. 3) is detected using a camera 308 of a mobile terminal 306 according to FIG. 3, or using a camera 332 according to FIG. 3 arranged on the determination device 330 or even using a camera (for example, camera 326 of the cleaning device 320 according to FIG. 3) comprised in a cleaning device.

In step 108b, a determination is made of the soiling information item indicative of at least one property of the soiling on the textile, wherein the at least one property is determined based at least in part on the detected first and second image information item.

The method ends in the case where the soiling of the textile could already be unambiguously determined after determining the soiling information item based at least in part on the detected first image information item.

FIG. 1c shows a flow diagram 100c with which, for example, a further indication for unambiguous determination of the soiling of the textile can be detected and determined. The flowchart 100c can be executed and/or controlled, for example, following a performed flowchart 100a and/or a performed flowchart 100b.

In the case where the soiling on the textile can not be determined unambiguously, as is checked, for example, in step 109c, determination of a property information item of the textile can be done in step 111c. Usually, a property information item of the textile can already be done based at least in part on the detected first image information item, since at least a part of the textile (for example, its structure) is already regularly comprised by the first image information item in addition to the soiling on the textile.

If at least a part of the textile is not comprised in the first image information item, in optional step 110c, a third image information item indicative of at least a part of the textile is detected. The detection of the third image information item can be done, for example, using one or more sensor elements (for example, a camera). For example, the soiling of the textile (for example, soiling 302 of the textile 304 according to FIG. 3) is detected using a camera 308 of a mobile terminal 306 according to FIG. 3, or using a camera 332 according to FIG. 3 arranged on the determination device 330 or even using a camera (for example, camera 326 of the cleaning device 320 according to FIG. 3) comprised in a cleaning device.

In step 112c, there is a determination of the soiling information item indicative of at least one property of the soiling on the textile, wherein the at least one property is detected based at least in part on the detected first image information item, or based at least in part on the first and second image information item, or based at least in part on the first and the second and the third image information item.

The method ends in the case where the soiling of the textile could already be unambiguously determined after determining the soiling information item based at least in part on the detected first image information item.

Figure 2A:
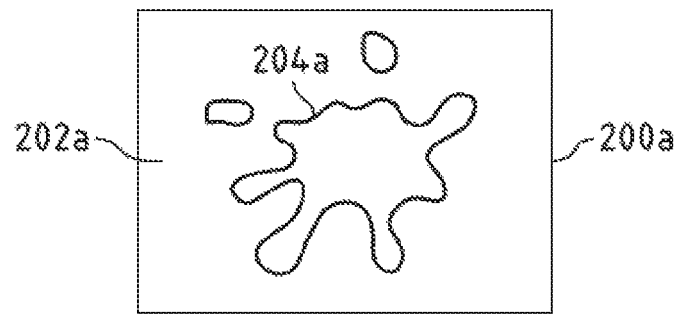
FIG. 2a is a first schematic representation of a soiling.

FIG. 2a shows a first schematic representation 200a of a soiling. FIG. 2a shows a schematic representation of a textile 202a having a soiling 204a, which can be detected, for example, as a first image information item. In an exemplary embodiment, the image information item can be analyzed, for example, by an evaluation item, wherein the evaluation unit, for example, uses image algorithms to be able to detect properties of the soiling on the textile can.

The detected first image information item can be, for example, a spectral image, wherein the spectral image originates in particular from the illumination of the surface of the soiling 204a on the textile 202a with light, in particular by reflection and emission from the surface of the soiling 204a and/or the textile 202a emitting radiation. These can be detected as a reflection information item, for example, by a physical measurement, in particular via one or more (optical) sensor elements. A detected first image information item is, for example, representative of the spatial resolution of the spectral image, and in particular can be recorded via a plurality of sensor elements, for example, pixels.

The soiling 204a is a soiling having a sharp edge shown schematically by the contour line of the soiling 204a. The soiling 204a further has outflowing regions, such as can arise from blood, beer or dairy products. The soiling can be determined accordingly (unambiguously) on the basis of determining a soiling information item, wherein the aforementioned non-limiting examples of a soiling are analyzed.

Figure 2B:
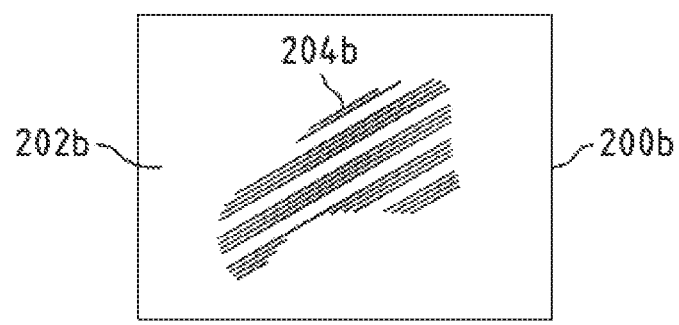
FIG. 2b is a second schematic representation of a soiling.

FIG. 2b shows a second schematic representation 200b of a soiling 204b on a textile 202b. In contrast to the soiling 204a, the soiling 204b also does not have a sharp edge. Also, the area of the soiling 204b is not homogeneous and a direction can be recognized by the structure of the soiling, namely in the direction of the stripes shown. The directionally dependent soiling shown schematically in FIG. 2b may have been created, for example, by a movement. For example, it can be a grass stain that has been created, for example, as part of a contact of the textile with a lawn. As already stated, further properties which depend, for example, on the outline of the soiling and/or on the color of the soiling can be taken into account in order to be able to determine the soiling information item accordingly.

Figure 3:
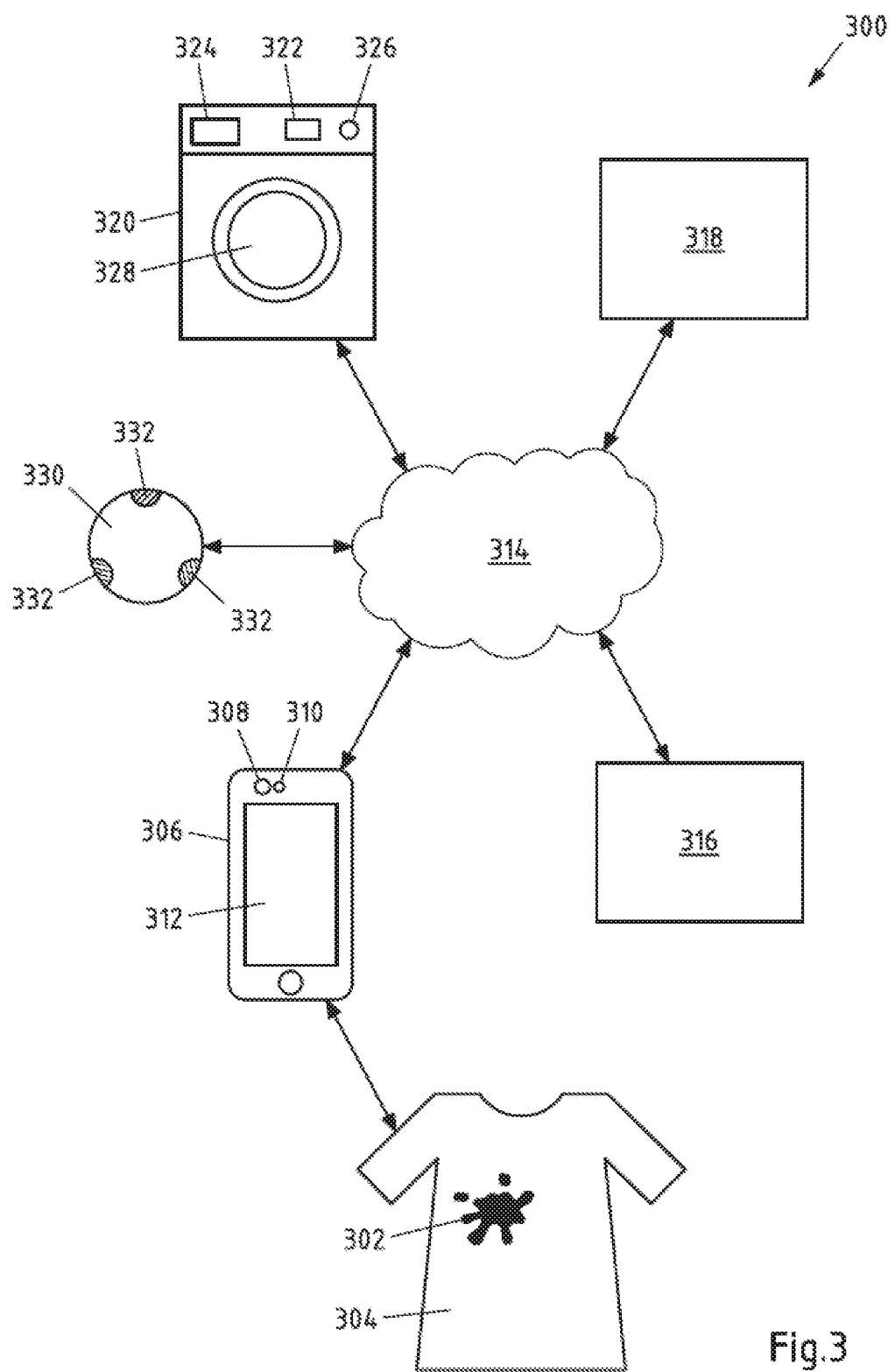
FIG. 3 is a schematic representation of an embodiment of a device according to the second aspect.

FIG. 3 shows an embodiment of a device 300 according to the second aspect or a system according to the third aspect. The device 300 is configured as or comprises corresponding features for performing and/or controlling a method according to the first aspect.

In particular, the device 300 facilitates determining a soiling information item (for example, an identification of a composition of a soiling 302 on a textile 304 and/or provides an identification regarding properties of the textile 304). For example, a recommendation for treating the textile 304 to remove the soiling 302 from the textile 304 can be provided based at least in part on the soiling information item or these information items in the form of a cleaning strategy parameter.

A first image information item, for example, representative of an image resulting from the illuminated surface of the soiling 302 on the textile 304 is first detected using an electronic device, here a smart phone 306. For this purpose, for example, an optical sensor element 308 is used, which can comprise a camera, for example. In addition, a radiation source 310 is provided which serves to illuminate the surface of the soiling 302 and/or the textile 304. The smart phone 306 also has a display element 312. The display element 312 can also be used, for example, to illuminate the surface of the soiling 302 and/or the textile 304 and, accordingly, as a radiation source.

The detected first image information item is obtained from a communication system 314. A determination device 330 is in communication with the communication system 314, for example, a server 316, which is configured to determine at least one soiling information item dependent on the soiling 302 from the first image information item. The determination device 330 can also comprise an evaluation unit (for example, an artificial neural network). Alternatively or additionally, a dedicated evaluation unit can be used, which, for example, communicates with the communication system 314. For example, the evaluation unit can determine an output variable on the basis of an adaptive evaluation algorithm, in particular by the neural network, in order to be able to unambiguously determine the soiling.

The determination of the output variable of the neural network comprises, for example, a comparison of the determined soiling information item with comparison values. The comparison values are stored, for example, in a database 318, which is also in communication with the communication system 314. In particular, the comparison values of database 318 contain soiling information items of previously detected soilings (for example, typically occurring in the household). These can be given as training cases by an input vector, a soiling information item and an output vector and stored accordingly in the database. The training cases can be used, for example, by a neural network in order to be able to determine an output variable based at least in part on a determined soiling information item by the neural network, wherein the output variable is dependent on the soiling based on the soiling information item. Further, the database 318 contains data associated with the comparison values in the form of, for example, treatment parameters with respect to a treatment to be recommended which is optimal for the corresponding soiling and optional properties of the textile, on which basis, for example, a cleaning strategy parameter can be determined.

The cleaning strategy parameter comprises, for example, a cleaning strategy as a treatment of the textile, comprising a cleaning agent type, an amount of cleaning agent, a cleaning temperature, a cleaning agent type, and settings of a cleaning device 320 or the like, to name a few non-limiting examples. The cleaning strategy parameter can be displayed, for example, on the display element 312 of the smart phone 306 and thus made available to the user. The user is thus provided with a recommendation for an optimal treatment for the specific soiling 302.

The cleaning device 320 is also in communication with the communication system 314, whereby the cleaning information item and/or optionally the cleaning strategy parameter can be output to the cleaning device 320. The cleaning device 320 has, for example, a display element 322, which in particular can display the soiling information item and/or optionally the cleaning strategy parameter. Furthermore, the cleaning device 320 has a dosing device 324 for cleaning agents. In this case, the dosing device 324 can provide a cleaning agent in accordance with the treatment parameters with respect to the cleaning agent type and/or the amount of cleaning agent, or check whether the cleaning agent has been introduced into the dosing device 324 in accordance with the recommended treatment of the textile 304.

Furthermore, the cleaning device 320 has a camera 326, by means of which, for example, the first image information item can be detected. The cleaning device 320 can further comprise an operating element (not shown) for the controller of the cleaning device 320 by a user. For example, the cleaning device 320 can be preset according to the cleaning strategy parameter. The user then has the option of following the recommendation of the cleaning strategy and simply starting the cleaning device 320 via the operating element 326 or performing one's own manual setting of the cleaning device 320 via the operating element 326. The cleaning is performed in a cleaning container 328, here a laundry drum.

Furthermore, a determination device 330 is shown in FIG. 3. The determination device 330 comprises sensor elements 332 and optionally at least one illumination feature (not shown). The determination device 330 has such a shape that when used in a cleaning device, neither the cleaning device nor the laundry can be damaged by the determination device 330. Accordingly, the determination device 330, for example, has a spherical shape, but also further particular shapes without pointed corners and edges are conceivable. The determination device 330 is configured to be arranged in the cleaning container 328 while performing a cleaning. The determination device 330 is in this case freely movable and resistant to an action of the washing solution in the cleaning container 328. The determination device 330 can thus detect a first, second and/or third image information item of the soiling 302, for example, before or during a cleaning process.

Figure 4:
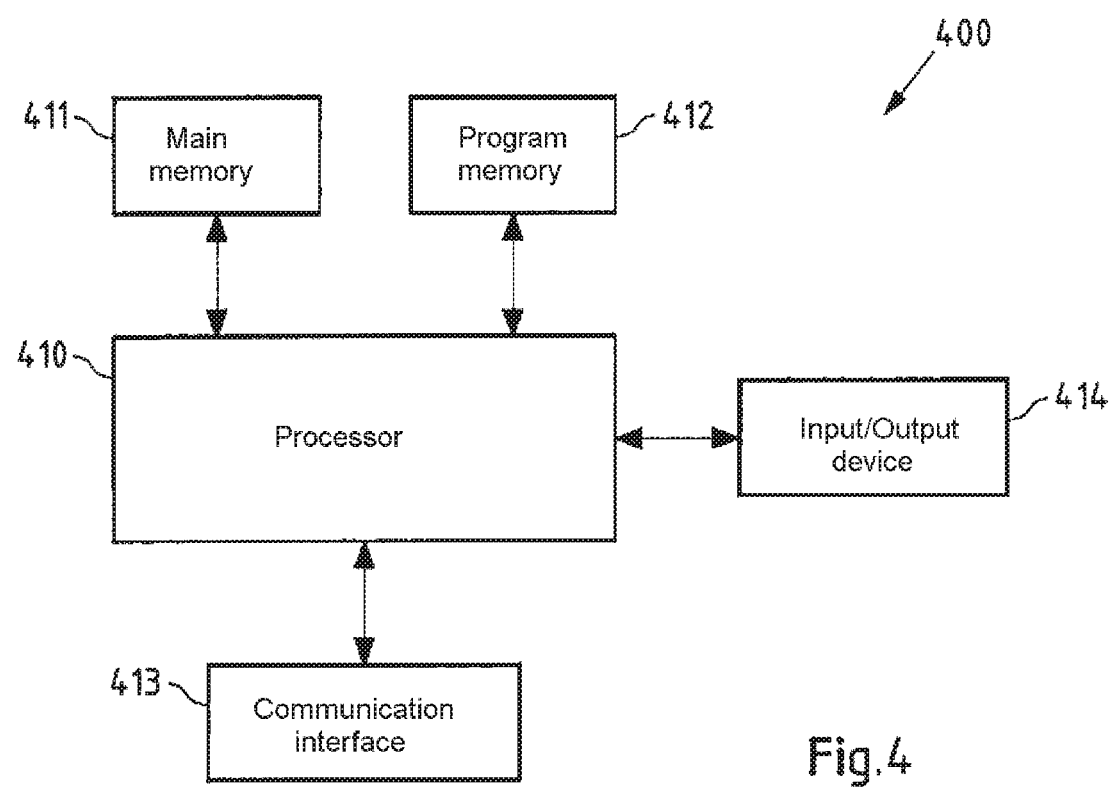
FIG. 4 is a block diagram of an embodiment of a device according to the second aspect.

FIG. 4 shows a block diagram of an embodiment of a device 400, which, in particular, can execute an exemplary method according to the first aspect. The device 400 is, for example, a device according to the second aspect or a system according to the third aspect.

The device 400 can be, for example, a computer, a desktop computer, a server, a thin client, or a portable computer (mobile device), such as a laptop computer, a tablet computer, a personal digital assistant (PDA), or a smart phone. For example, the device can fulfill the function of a server or a client.

Processor 410 of device 400 is particularly formed as a microprocessor, microcontrol unit, microcontroller, digital signal processor (DSP), application specific integrated circuit (ASIC) or field programmable gate array (FPGA).

Processor 410 executes program instructions stored in program memory 412 and, for example, stores intermediate results or the like in working or main memory 411. For example, program memory 412 is a nonvolatile memory such as a flash memory, a magnetic memory, an EEPROM memory (electrically erasable programmable read only memory), and/or an optical memory. Main memory 411 is, for example, a volatile or non-volatile memory, in particular, a random access memory (RAM) such as a static RAM (SRAM), a dynamic RAM (DRAM), a ferroelectric RAM (FeRAM), and/or a magnetic RAM memory (MRAM).

Program memory 412 is preferably a local data carrier permanently attached to device 400. Data carriers permanently connected to the device 400 are, for example, hard disks which are built into the device 400. Alternatively, the data carrier can, for example, also be a data carrier which can be connected in separable manner to the device 400, such as a memory stick, a removable data carrier, a portable hard disk, a CD, a DVD and/or a diskette.

Program memory 412 contains, for example, the operating system of device 400, which is at least partially loaded into main memory 411 and executed by processor 410 when device 400 is started. In particular, when device 400 starts, at least one part of the kernel of the operating system is loaded into main memory 411 and executed by processor 410. The operating system of device 400 is, for example, a Windows, UNIX, Linux, Android, Apple iOS, and/or MAC operating system.

In particular, the operating system enables the use of the device 400 for data processing. It manages, for example, resources such as main memory 411 and program memory 412, communication interface 413, input and output device 414, provides basic functions, among other things through programming interfaces, to other programs and controls the execution of programs.

Processor 410 controls the communication interface 413, which can be, for example, a network interface and can be in the form of a network card, network module and/or modem. The communication interface 413 is, in particular, configured to establish a connection of the device 400 to other devices, in particular, via a (wireless) communication system, for example, a network, and to communicate with them. The communication interface 413 can, for example, receive data (via the communication system) and forward it to processor 410 and/or receive and send data (via the communication system) from processor 410. Examples of a communication system are a local area network (LAN), a wide area network (WAN), a wireless network (for example, according to the IEEE 802.11 standard, the Bluetooth (LE) standard and/or the NFC standard), a wired network, a mobile network, a telephone network and/or the Internet.

Furthermore, processor 410 can control at least one input/output device 414. Input/output device 414 is, for example, a keyboard, a mouse, a display unit, a microphone, a touch-sensitive display unit, a loudspeaker, a reading device, a drive and/or a camera. For example, input/output device 414 can receive inputs from a user and forward them to processor 410 and/or receive and output information items to the user of processor 410.

Figure 5:
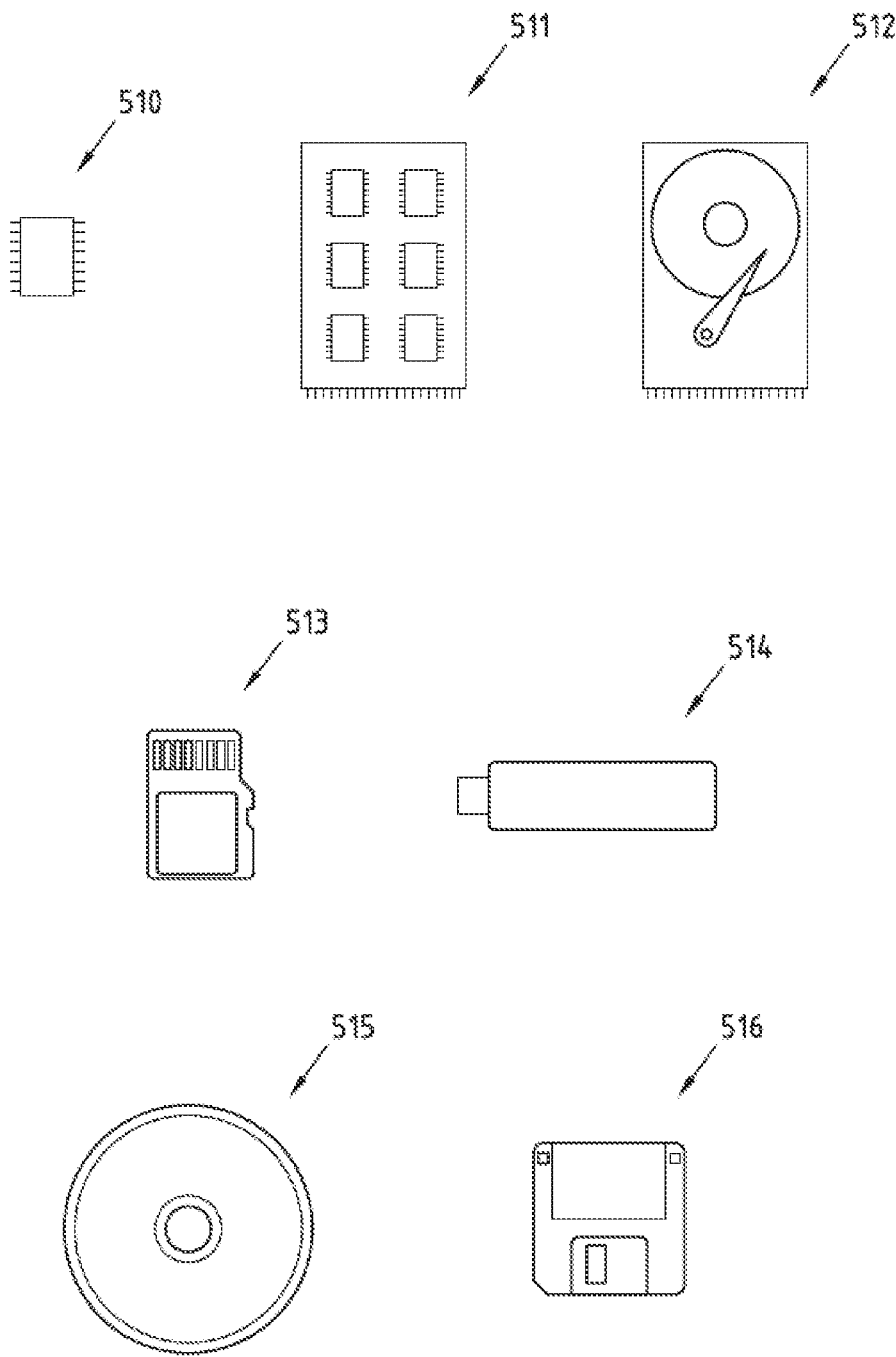
FIG. 5 is different embodiments of a storage medium according to the second aspect.

Finally, FIG. 5 shows different embodiments of storage media on which an embodiment of a computer program as contemplated herein can be stored. The storage medium can be, for example, a magnetic, electrical, optical and/or other type of storage medium. For example, the storage medium can be part of a processor (for example, processor 410 of FIG. 4), such as a (non-volatile or volatile) program memory of the processor or a part thereof (such as program memory 412 in FIG. 4). Embodiments of a storage medium are a flash memory 510, an SSD hard disk 511, a magnetic hard disk 512, a memory card 513, a memory stick 514 (for example, a USB stick), a CD-ROM or DVD 515, or a diskette 516.

The following embodiments should also be understood as being disclosed:

Embodiment 1

A method performed by one or more devices, comprising:
detecting a first image information item indicative of at least one soiling on a textile;
determining a soiling information item indicative of at least one property of the soiling on the textile, wherein the at least one property is determined based at least in part on the detected first image information item, and wherein the at least one property of the soiling is determined based at least in part on a property dependent on the outline of the soiling;
outputting or causing the outputting of the determined soiling information item.

Embodiment 2

Method according to embodiment 1, wherein one or more of the following parameters i) to iv) determine the property dependent on the outline of the soiling:
i) form of the soiling;
ii) structure of the soiling;
iii) size of the soiling;
iv) contour of the soiling.

Embodiment 3

Method according to one of the preceding embodiments, wherein the at least one property of soiling of the textile is determined based at least in part on a property dependent on the color of the soiling.

Embodiment 4

Method according to embodiment 3, wherein one or more of the following parameters v) to x) determine the property dependent on the outline of the soiling:
v) isotropy of the soiling;
vi) three-dimensionality of the soiling;
vii) color design of the soiling;
viii) color and/or color intensity homogeneity of the soiling;
ix) transparency of the soiling;
x) gloss of the soiling.

Embodiment 5

Method according to one of preceding embodiments, the method further comprising:
  determining at least one cleaning strategy parameter of the textile based at least in part on the determined soiling information item; and

Embodiment 6

Method according to one of preceding embodiments, the method further comprising:
  performing or causing the performance of a treatment of the textile corresponding to the at least one determined cleaning strategy parameter via at least one treatment device, in particular a cleaning device.

Embodiment 7

Method according to embodiment 6, wherein the determined cleaning strategy parameter represents one or more of the following parameters:
a) cleaning agent type;
b) amount of cleaning agent;
c) cleaning temperature;
d) type of cleaning device;
e) one or more settings of the cleaning device;
f) recommendation of pretreatment of the soiling;
g) performing a special treatment.

Embodiment 8

Method according to embodiment 6 or embodiment 7, the method further comprising:
  performing or causing the performance of a treatment based at least in part on the cleaning strategy parameter by a cleaning device.

Embodiment 9

Method according to one of preceding embodiments, the method further comprising:
  determining a property information item of the textile, wherein the property information item of the textile is indicative of at least one property of the textile, wherein the at least one cleaning strategy parameter is determined based at least in part on the determined property information item.

Embodiment 10

Method according to embodiment 9, wherein the at least one property of the textile is indicative of material structure, material type, material distribution, material wear of the textile, color of the fabric of the textile, form of the fabric of the textile, or a combination thereof.

Embodiment 11

Method according to one of the preceding embodiments, wherein the at least one cleaning strategy parameter is determined by a neural network, in particular an artificial neural network, wherein in a first step, a classification of the soiling is done based at least in part on the determined soiling information item or based at least in part on the determined soiling information item and the determined property information item of the textile, and in a second step, the cleaning strategy parameter is derived based at least in part on the classification of the soiling.

Embodiment 12

Method according to one of the preceding embodiments, wherein the classification is performed by a cluster recognition, wherein the detected first image information item or the detected first image information item and the detected second image information item is used as an input information item, parameters of determined soilings associated with the defined clusters are used as a function of the neural network, and an information item indicative of a defined soiling is output as an output information item.

Embodiment 13

Method according to one of the preceding embodiments, wherein the image information item is detected by one or more sensors, in particular by one or more optical sensor elements.

Embodiment 14

Method according to one of the preceding embodiments, wherein the one or more optical sensor elements are formed as one of the following features:
(i) camera, in particular a 3D camera or hyperspectral camera;
(ii) LED sensor element;
(iii) NIR sensor element.

Embodiment 15

Method according to one of preceding embodiments, the method further comprising:
  detecting a second image information item indicative of at least the soiling on the textile, wherein the second image information item detects the opposite side of the soiling relative to the first image information item, wherein the at least one property is determined based at least in part on the detected first and second image information item,

Embodiment 16

The method of the embodiment 15, wherein the determination of the soiling information item comprises comparing the detected first image information item or the detected first and second image information item with comparison values.

Embodiment 17

Method according to one of preceding embodiments, the method further comprising:
  determining a soiling profile based at least in part on the cleaning strategy parameter, in particular based on a plurality of determined cleaning strategy parameters, wherein the determination of the cleaning strategy parameter is based at least in part on the soiling profile in the case where a soiling profile (previously, initially) has been determined.

Embodiment 18

Method according to one of the previous embodiments, wherein at least one of the devices for performing the method is a mobile device.

Embodiment 19

Device which is configured as or comprises corresponding features to perform and/or to control a method according to one of embodiments 1 to 18.

Embodiment 20

Device according to the embodiment 19, wherein the device is an electronic device, in particular a mobile device.

Embodiment 21

Device comprising at least one processor and at least one memory having computer program code, wherein the at least one memory and the computer program code are configured with the at least one processor to execute and/or to control at least one method according to one of the embodiments 1 to 18.

Embodiment 22

Computer program comprising program instructions that cause a processor to execute and/or control a method according to one of the embodiments 1 to 18 when the computer program is run on the processor.

Embodiment 23

Computer readable storage medium comprising a computer program according to the embodiment 22.

Embodiment 24

A system comprising:
  a plurality of devices, in particular at least one mobile device and a cleaning device, which together perform and/or control a method according to one of the embodiments 1 to 23.

The embodiments of the present disclosure described in this specification and the respective optional features and properties cited in this context should also be understood as disclosing all combinations with one another. In particular, the description of a feature encompassed by an embodiment is, unless explicitly explained to the contrary, not to be understood in this case as meaning that the feature is necessary or essential for the function of the embodiment. The sequence of the method steps described in this specification in the individual flowcharts is not mandatory, alternative sequences of the method steps are conceivable. The method steps can be implemented in various ways, so an implementation in software (by program instructions), hardware, or a combination of both to implement the method steps is conceivable.

Terms used in the patent claims, such as "comprising", "having", "including", "containing" and the like, do not exclude further elements or steps. The expression "at least partially" includes both the "partial" and "full" cases. The expression "and/or" should be understood as meaning that both the alternative and the combination should be disclosed, that is, "A and/or B" means "(A) or (B) or (A and B)". The use of the indefinite article does not exclude a plurality. A single device can perform the functions of several units or devices mentioned in the patent claims. Reference signs indicated in the patent claims should not be regarded as limitations on the means and steps employed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A method performed by one or more devices, the method comprising the steps of:
  detecting a first image information item indicative of at least one soiling on a textile;
  determining a soiling information item indicative of at least one property of the soiling on the textile, wherein the at least one property is determined based on the detected first image information item, and wherein the at least one property of the soiling of the textile is determined based on a property dependent on an outline of the soiling;
  outputting or causing the outputting of the determined soiling information item; and
  determining at least one cleaning strategy parameter of the textile based on the determined soiling information item,
  wherein the at least one cleaning strategy parameter is determined by a neural network, wherein in a first step, a classification of the soiling is done based on the determined soiling information item or based on the determined soiling information item and the determined property information item of the textile, and in a second step, the cleaning strategy parameter is derived based on the classification of the soiling.

2. The method according to claim 1, wherein one or more of the following parameters i) to iv) determine the property dependent on the outline of the soiling:
  i) form of the soiling;
  ii) structure of the soiling;
  iii) size of the soiling; and
  iv) contour of the soiling.

3. The method according to claim 1, wherein the at least one property of the soiling of the textile is determined based on a property dependent on a color of the soiling.

4. The method according to claim 3, wherein one or more of the following parameters v) to x) determine the property dependent on the outline of the soiling:
- v) isotropy of the soiling;
- vi) three-dimensionality of the soiling;
- vii) color design of the soiling;
- viii) color and/or color intensity homogeneity of the soiling;
- ix) transparency of the soiling; and
- x) gloss of the soiling.

5. The method according to claim 1, the method further comprising the step of:
performing or causing a performance of a treatment of the textile corresponding to the at least one determined cleaning strategy parameter via at least one treatment device.

6. The method according to claim 5, wherein the determined cleaning strategy parameter represents one or more of the following parameters:
- a) cleaning agent type;
- b) amount of cleaning agent;
- c) cleaning temperature;
- d) type of cleaning device;
- e) one or more settings of the cleaning device;
- f) recommendation of a pretreatment of the soiling; and
- g) recommendation to perform a special treatment.

7. The method according to claim 5, the method further comprising the step of:
performing or causing the performance of a treatment based on the cleaning strategy parameter by a cleaning device.

8. The method according to claim 1, the method further comprising the step of:
determining a property information item of the textile, wherein the property information item of the textile is indicative of at least one property of the textile, wherein the at least one cleaning strategy parameter is determined based on the determined property information item.

9. The method according to claim 8, wherein the at least one property of the textile is indicative of material structure, material type, material distribution, material wear of the textile, color of the fabric of the textile, form of the fabric of the textile, or a combination thereof.

10. The method according to claim 1, wherein the first image information item is detected by one or more sensors.

11. The method according to claim 10, wherein the one or more sensors is further defined as one or more optical sensor elements.

12. The method according to claim 1, the method further comprising the step of:
detecting a second image information item indicative of at least the soiling on the textile, wherein the second image information item detects an opposite side of the soiling relative to the first image information item, wherein the at least one property of the soiling is determined based on the detected first and second image information item.

13. The method according to claim 12, wherein the determination of the soiling information item comprises comparing the detected first image information item or the detected first and second image information item with comparison values.

14. A device which is configured to perform and/or to control a method according to claim 1.

15. The method according to claim 1, wherein the neural network is further defined as an artificial neural network.

* * * * *